United States Patent [19]

Hoda

[11] 4,212,919
[45] Jul. 15, 1980

[54] STRENGTHENED POLYCHROMATIC GLASSES

[75] Inventor: Syed N. Hoda, Horseheads, N.Y.

[73] Assignee: Corning Glass Works, Corning, N.Y.

[21] Appl. No.: 52,937

[22] Filed: Jun. 28, 1979

[51] Int. Cl.² .................. C03C 21/00; C03C 3/20; C03C 3/04

[52] U.S. Cl. .................. 428/410; 106/47 Q; 106/DIG. 6; 106/52; 65/30 E

[58] Field of Search .................. 106/47 Q, 52, DIG. 6; 65/30 E; 428/410, 428

[56] References Cited

U.S. PATENT DOCUMENTS

| | | | |
|---|---|---|---|
| 3,485,702 | 12/1969 | Mochel | 106/52 |
| 3,790,430 | 2/1974 | Mochel | 106/52 |
| 4,017,318 | 4/1977 | Pierson et al. | 106/52 |
| 4,092,139 | 5/1978 | Ference | 106/52 |
| 4,118,214 | 10/1978 | Wedding | 106/52 |

Primary Examiner—O. R. Vertiz
Assistant Examiner—Mark Bell
Attorney, Agent, or Firm—Clinton S. Janes, Jr.

[57] ABSTRACT

This invention is concerned with the production of chemically strengthened polychromatic glasses. In the preferred embodiment, the glasses are suitable for ophthalmic applications, i.e., the glasses have a refractive index of at least 1.523 and, after chemical strengthening, will exhibit a surface compression layer having a depth of at least 0.002", a maximum central tension of at least 0.7 kg/mm², and a modulus of rupture of at least approximately 30,000 psi such as to pass the FDA strength requirements for glass ophthalmic lenses. For this preferred embodiment, the chemical strengthening reaction will be conducted for a period not exceeding about 24 hours and the glasses will have compositions consisting essentially, by weight on the oxide basis as calculated from the batch of about 11–18% $Na_2O$, 60–70% $SiO_2$, 3–12% $ZrO_2$, 0–18% ZnO and/or 0–14% $Al_2O_3$, the total ZnO+$Al_2O_3$ not exceeding about 20%, 0–5% BaO, 0.005–0.3% Ag, 0.01–0.2% $CeO_2$, 1–4% F, and an amount of at least one halide selected from the group of Cl, Br, and I sufficient to react stoichiometrically with the Ag, but not more than about 3%.

5 Claims, No Drawings

STRENGTHENED POLYCHROMATIC GLASSES

BACKGROUND OF THE INVENTION

Polychromatic glasses, i.e., glasses wherein a full spectrum of colors can be secured in a single composition, had their genesis in U.S. Pat. No. 4,017,318. As disclosed therein, such glasses are produced through a series of irradiation and heat treating steps. A wide range of base glass compositions is operable but, as essential components, each glass must include silver, an alkali metal oxide which is preferably $Na_2O$, fluoride, and at least one halide selected from the group of chloride, bromide, and iodide. The glass articles are irradiated with high energy or actinic radiations selected from the group of high velocity electrons, X-radiations, and ultra-violet radiations, the latter generally having wavelengths within the range of about 2800Å–3500Å. The heat treatments involve subjecting the glass articles to temperatures between about the transformation range up to about the softening point thereof. Where ultra-violet radiation constitutes the effective actinic radiation, that patent indicates the presence of $CeO_2$ to be necessary in the glass composition.

As is explained in that patent, the method for preparing such glasses comprehends seven general steps.

First, a glass-forming batch of an appropriate composition is melted.

Second, the molten batch is simultaneously cooled and shaped into a glass article of a desired configuration.

Third, the glass article is exposed to high energy or actinic radiations, this exposure effecting the development of a latent image in the glass. The time and intensity of this exposure determines the final color which will be produced in the glass.

Fourth, the so-exposed glass article is subjected to a heat treatment which promotes the precipitation of colloidal silver particles in situ to function as nuclei. Where a colored transparent glass is the goal, this heat treatment will be continued for only so long as to cause the precipitation of colloidal silver and to initiate the growth thereon of extremely small microcrystals of alkali metal fluoride-silver halide, e.g., NaF·(AgCl and/or AgBr and/or AgI). Where a colored opal glass is desired, this heat treatment will be undertaken for a period of time sufficient to not only induce the precipitation of colloidal silver nuclei, but also to effect the growth of said microcrystals on the silver nuclei to a size large enough to scatter light. Hence, opacity will be developed in the exposed portions of the glass article with any unexposed portion remaining transparent.

Fifth, the nucleated glass article is called to a temperature at least 25° C. below the strain point of the glass, optionally to ambient or room temperature.

Sixth, the cooled glass article is exposed to high energy or actinic radiations, this exposure intensifying the color which will subsequently be developed. (The color to be produced was determined in Step 3 above).

Seventh, the re-exposed glass article is again subjected to a heat treatment which produces the desired color in the glass. It was theorized that this heat treatment caused the precipitation of submicroscopic particles of silver, either as discrete colloidal particles and/or deposited on the surface and/or deposited within the alkali metal fluoride-silver halide microcrystals.

Although the mechanism underlying the development of color in such glasses has not been fully elucidated, it is hypothesized to be related to the quantity of silver precipitated and the geometry thereof, as well as, perhaps, the refractive index of the crystals. Furthermore, because the colors can be obtained with very low contents of silver and demonstrate characteristics similar to interference colors, it has been conjectured that at least one of the three following circumstances exists: (1) discrete colloidal silver particles less than about 200Å in the smallest dimension; (2) metallic silver deposited within the alkali metal fluoride-silver halide microcrystals, the silver-containing portion of the microcrystals being less than about 200Å in the smallest dimension; and (3) metallic silver deposited upon the surface of the microcrystals, the silver-coated portion of the microcrystals being less than about 200Å in the smallest dimension.

Finally, the patent observed that the heat treatment after each exposure to high energy or actinic radiation could optionally be in the form of a series of heatings and coolings rather than a single treatment as set out above. Such additional heat treatments do not appear to substantially alter the color developed but can intensify the color produced.

U.S. Pat. No. 4,092,139 describes a modification of the method for preparing polychromatic glasses disclosed in U.S. Pat. No. 4,017,318, supra. That modification contemplated combining the exposure to high energy or actinic radiation and heat treatment into a single process. That is, the exposure is carried out while the glass article is at a temperature between about 200°–410° C. The inventive method is stated to be operable over the composition ranges recited in U.S. Pat. No. 4,017,318 and provides the advantage of producing a similar product while reducing the treatment time required to secure a colored glass and, at the same time, improving the intensity of the color developed.

The Food and Drug Administration (FDA) has ruled that all lenses sold in the United States for ophthalmic applications must pass a specified ball drop test, viz., a ⅝" diameter steel ball falling from a height of 50". To comply with this ruling has required that lenses formed from glass be strengthened in some manner. Two methods to achieve such strengthening have generally been practiced in the industry.

The first of these, termed air tempering or thermal tempering, involves heating the glass lens to a temperature approaching the softening point of the glass and then quickly chilling it, customarily through quenching in a stream of cool air. This practice is not available for use with polychromatic glasses because the colors therein are removed completely at temperatures approximating the strain point of the glasses.

The second method, variously called chemical strengthening or chemical tempering, comprehends an ion exchange reaction carried out at elevated temperatures but below the strain point of a glass. In the most common case, a glass containing alkali metal ions is contacted with a source of alkali metal ions (typically a bath of a molten salt) having a larger ionic radius than the alkali metal ions in the glass. Upon contact, the larger ions diffuse into the surface of the glass and replace the smaller alkali metal ions on an equal molar basis. Because the ion exchange is carried out at temperatures below the strain point of the glass, the larger ions are squeezed or stuffed into the sites originally occupied by the smaller ions. Since the glass structure at those temperatures is relatively firm, this crowding of the larger ions into the surface of the glass body causes compressive stresses to be developed in the glass surface, thereby imparting improved mechanical strength to the glass article.

The rate at which the ion exchange reaction takes place is directly dependent upon the temperature employed. Nevertheless, as the temperature closely approaches the strain point of the class, stress relaxation will occur in the surface of the article with consequent reduction in strength improvement. Accordingly, empirical testing will be undertaken to determine the temperature at which maximum surface compression can be developed (within a practical length of time) without significant stress release. Furthermore, as was noted above, the colors in polychromatic glasses are lost when exposed to temperatures approximating the strain points thereof.

Laboratory experience has determined that those glasses which develop an ion exchanged surface layer of at least 0.002" in depth, a maximum central tension of at least 0.7 kg/mm$^2$, and a modulus of rupture approaching 30,000 psi will typically survive the ball drop text. An ion exchange reaction time of less than about 24 hours is preferred from a commercial point of view, although longer times may yield comparable or even superior strengths.

Where a lens is designed for prescription ophthalmic applications, the refractive index of the glass takes on critical significance. Hence, the standard refractive index utilized in glass prescription lenses is 1.523±0.0003. This circumstance is due to the type of glasses presently in commercial use. A glass having a different refractive index would necessitate changes in the apparatus conventionally used by the lens manufacturer and, therefore, would not be a commercially saleable product.

The preferred embodiment recited in U.S. Pat. No. 4,017,318 consisted essentially, in weight percent on the oxide basis, of about 10–20% $Na_2O$, 0.0005–0.3% Ag, 1–4% F, an amount of at least one halide selected from the group consisting of Cl, Br, and I sufficient to react stoichiometrically with the Ag, but not more than a total of about 3%, and the remainder $SiO_2$. Where ultraviolet radiation constitutes the actinic radiation, 0.01–0.2% $CeO_2$ will be included in the composition. The patent notes the optional useful additions of up to 18% ZnO and/or up to 10% $Al_2O_3$.

SUMMARY OF THE INVENTION

Glasses prepared from compositions solely within the $Na_2O$-Ag-F-halide-$SiO_2$ system exhibit indices far below 1.523. $Al_2O_3$ has little effect upon refractive index. ZnO does raise the refractive index but the total required to reach 1.523 was found to be about 20%, an amount which seriously degraded the polychromatic capability of the glass. Accordingly, oxides outside of the basic system, as defined in U.S. Pat. No. 4,017,318, were investigated.

Unfortunately, many oxides of high molar refractivity such as $TiO_2$, PbO, and $Fe_2O_3$ strongly absorb ultraviolet radiation, the preferred form of actinic radiation, thereby seriously reducing the photosensitivity of the glass. Others, such as $La_2O_3$, $Ta_2O_5$, and $GeO_2$, cannot be included to any useful degree, i.e., not more than a maximum of about 1–2%, without adversely affecting polychromatic behavior. Still others, such as $Li_2O$, $K_2O$, MgO, CaO, $Y_2O_3$, and SrO, interact with the fluoride ions which, in turn, disturbs the crystallization of NaF, thereby leading to deterioration of polychromatic properties.

A summary of these investigations resulted in the conclusion that the practical choices for increasing the refractive index of the base polychromatic glasses were three; viz., BaO, $ZrO_2$, and ZnO, the latter being used in conjunction with another high refractivity oxide. Of the three, $ZrO_2$ appeared to possess the highest specific refractivity. It is also known to have an advantageous effect upon the chemical durability and ion exchange characteristics of numerous glasses. Additions of up to 12% $ZrO_2$ can be incorporated into the base glasses without deleteriously affecting the polychromatic characteristics.

The above-recited base glass composition ranges from U.S. Pat. No. 4,017,318 do not demonstrate any substantial improvement in mechanical strength when subjected to an ion exchange, chemical strengthening technique. The inclusion of $Al_2O_3$ in silicate glasses to facilitate ion exchange therein, with concomitant improvement in strength, is taught in U.S. Pat. No. 3,790,430. The presence of $Al_2O_3$ is believed to play two roles. First, $Al^{+3}$ ions appear to effect a decrease in the number of non-bridging oxygens in the silica tetrahedra, thereby promoting a more cohesive glass structure with a higher strain point. Second, $Al^{+3}$ ions engender a redistribution of charge between the sodium and oxygen ions such that the sodium-oxygen bond strength is diminished, thereby facilitating $Na^+$ ion diffusion. However, contrary to expectations, the inclusion of $Al_2O_3$ in the base polychromatic glasses did not provide the desired increase in diffusion during the ion exchange reaction. It is hypothesized that the presence of $F^-$ ions in the glass may nullify the $Al_2O_3$ effects on glass structure, thereby causing the results to be at variance with the known effect of $Al_2O_3$ in glasses subjected to ion exchange. Nevertheless, alumina additions are useful in raising the strain point of the glass (~5° C./1% increase in $Al_2O_3$) and, hence, permit the chemical strengthening to be carried out at higher temperatures. Accordingly, $Al_2O_3$ will advantageously be included in the glass compositions.

ZnO improves the strength of the base polychromatic glasses when such are chemically strengthened. Thus, the addition of ZnO can raise the central tension of a glass article. However, its presence also appears to reduce somewhat the depth of the ion exchanged layer. It is believed that this phenomenon can be explained in the following manner.

Inasmuch as zinc is deemed to be present in the glass structure largely as a modifying cation, it will tend to block the diffusion of $K^+$ or other large alkali metal ion into the glass surface, thereby resulting in decreased depth of $K^+$ ion penetration with increased amounts of $Zn^{+2}$. However, the $Zn^{+2}$ ion stiffens the glass through ~3.5° C. increase in strain point for each 1% of ZnO addition. Moreover, the concentration of $K^+$ ions in the surfaces of glasses containing higher percentages of ZnO may be greater because of the slower diffusion rate thereof into the interior of the glass article. Both of those factors will tend to contribute toward a greater retention of surface compression.

The addition of $ZrO_2$ to the base polychromatic glasses raises the strain points thereof ~4° C./each one percent $ZrO_2$ and reduces the viscosity of the glasses at the melting temperatures. Furthermore, and most significantly, $ZrO_2$ opens up the glass structure leading to higher strengths, better diffusion rates, and deeper exchanged layers when the glasses are subjected to chemical strengthening. The strengthening effect of $ZrO_2$ is even more pronounced when present in conjunction with $Al_2O_3$.

U.S. Pat. No. 3,485,702 discusses the utility of incorporating $ZrO_2$ into glass compositions to produce improved strengths when subjected to ion exchange reactions. However, the capability of incorporating extensive quantities of $ZrO_2$ in polychromatic glasses without destroying the color sensitivity thereof is nowhere even alluded to.

The addition of BaO to base polychromatic glass compositions subjected to chemical strengthening causes a decrease in the depth of the ion exchanged surface layer with little change in the central tension. Accordingly, the addition of BaO can be tolerated up to about 5% to assist in raising the refractive index of the glasses, but most preferably only in conjunction with high levels of $ZrO_2$ and/or ZnO, since BaO appears to exert an adverse effect upon the strength that can be developed via chemical strengthening. (Obviously, where ophthalmic applications are not envisioned, strength requirements assume less importance.)

A survey of other oxides frequently used in glass compositions indicated that only a few thereof can be added in any substantial quantity without deleteriously affecting the polychromatic properties. While not adversely affecting color, the addition of $Li_2O$ sharply reduced the central tension of the glass article upon chemical strengthening. $K_2O$ additions appeared to improve strength somewhat when chemical strengthening was undertaken at relatively low temperatures, but the reverse situation occurred when the strengthening treatment was conducted at higher temperatures. The central tension in all the $K_2O$-containing glasses decreased when the ion exchange reaction was carried out for long periods of time or at higher temperatures (but below the strain point of the glass). The $Na_2O+K_2O$ mixed alkali effect seems to make the glass more fluid at higher temperatures such that stresses are released faster than they are developed during the ion stuffing of the surface. The addition of $P_2O_5$ provided notable strength improvement when the glass was chemically strengthened, but color sensitivity was essentially destroyed. Small additions, i.e., up to ~5%, of $B_2O_3$ appeared to have no substantive effect upon the strengthening capability or the polychromatic behavior of the glasses.

As was observed above, the polychromatic colors are stable up to about the strain point of the glass. Likewise, the chemical strengthening practice will be conducted at temperatures no higher than the strain point of the glass and, preferably, at several degrees below the strain point. Accordingly, the strain point of the glass places an upper limit on temperatures of treatment. With the glasses operable in this invention, that temperature is less than about 475° C., commonly less than 450° C. Chemical strengthening can be achieved utilizing ion exchange temperatures as low as about 350° C., but the time required to promote substantial ion exchange is normally too long (up to several days) to be economically feasible. Consequently, temperatures between about 400°–450° C. are generally preferred since good strength improvement will commonly be perceived after a 16–24 hour treatment. An optimum temperature appears to be about 20° C. below the strain point of the glass.

Where refractive index adjustment is not sought, glasses which can be chemically strengthened to develop an exchanged layer having a depth of at least 0.002", a maximum central tension of at least 0.7 $kg/mm^2$, and a modulus of rupture of at least approximately 30,000 psi, while demonstrating good polychromatic characteristics, can be prepared from compositions consisting essentially, by weight on the oxide basis as calculated from the batch, of about 11–18% $Na_2O$, 60–70% $SiO_2$, 2–12% $ZrO_2$, 0.005–0.3% Ag, 1-14 4% F, and an amount of at least one halide selected from the group consisting of Cl, Br, and I sufficient to react stoichiometrically with the Ag, but not more than about 3%. Where ultra-violet radiation will constitute the actinic radiation, 0.01–0.2% $CeO_2$ will preferably also be present. Additions of up to 14% $Al_2O_3$ and/or up to 18% ZnO, the total thereof not exceeding about 20%, may advantageously be included. The incorporation of up to 2% $K_2O$ and/or up to 5% $B_2O_3$ may be useful. Up to 5% BaO may be included but such does not appear to aid in improving the strength of the glass. The preferred base compositions yielding good strength improvement coupled with excellent polychromatic colors consist essentially, by weight on the oxide basis as calculated from the batch, of about 14–17% $Na_2O$, 62–68% $SiO_2$, 3–8% $ZrO_2$, 2–12% $Al_2O_3$, and 5–13% ZnO.

Where $ZrO_2$ alone is employed to raise the refractive index of the base glass to at least 1.523, a minimum of 8% thereof will be required. However, the preferred glasses will customarily contain $Al_2O_3$ and ZnO which work in conjunction with $ZrO_2$ during the chemical strengthening treatment, while modifying the melting and forming behavior of the glass. Moreover, up to 5% BaO may be included to assist in raising the refractive index. Accordingly, polychromatic glasses which can be chemically strengthened to develop an exchanged layer of a depth of at least 0.002", a maximum central tension of a least 0.7 $kg/mm^2$, and a modulus of rupture of at least approximately 30,000 psi, and which have a refractive index of at least 1.523 can be prepared from compositions consisting essentially, by weight on the oxide basis as calculated from the batch, of about 11–18% $Na_2O$, 60–70% $SiO_2$, 3–12% $ZrO_2$, 0–18% ZnO and/or 0–14% $Al_2O_3$, the total $Al_2O_3$+ZnO not exceeding about 20%, 0–5% BaO, 0.005–0.3% Ag, 1–4% F, and an amount of at least one halide selected from the group consisting of Cl, Br, and I sufficient to react stoichiometrically with the Ag, but not more than about 3%.

The precursor polychromatic glass articles operable in the present invention can be produced by the method described in U.S. Pat. No. 4,017,318 or the improvement upon that basic method which is discussed in U.S. Pat. No. 4,092,139. Hence, the method of forming the precursor polychromatic glass articles comprises no part of the instant invention.

The preferred mode for carrying out the chemical strengthening procedure contemplates contacting the glass article with a bath of molten salt, although other forms of contact such as pastes and sprays can also be effective. In the interests of convenience and economics, $K^+$ ions customarily form the ion exchange medium, although such larger ions as $Rb^+$ and $Cs^+$ are also effective. A bath of molten $KNO_3$, having a melting point of 334° C., constitutes the preferred source of $K^+$ ions.

DESCRIPTION OF PREFERRED EMBODIMENTS

Table I records several compositions, expressed in terms of parts by weight on the oxide basis as calculated from the batch, which act to illustrate the parameters of the instant invention. Inasmuch as it is not known with which cation(s) the halides are combined, they are simply reported in terms of the individual halide, in accordance with conventional glass analysis practice. Furthermore, because the quantities of silver utilized are so small, they are simply tabulated as Ag. The actual batch ingredients can comprise any materials, either the oxide or other compound which, when melted together, will be converted into the desired oxide in the proper proportions. The halides were customarily added as alkali metal halides. Where $Sn^{+2}$ was employed as a thermoreducing agent, $SnO_2$ was frequently added as the batch material for that purpose. Since the sum of the individual ingredients is or closely approximates 100, each component may, for practical purposes, be deemed to be present in weight percent. Finally, although the following exemplary compositions represent laboratory melts, it will be recognized that large scale commercial melts using pots or continuous tanks can be carried out with glasses of the present invention.

The batches were compounded, the ingredients ball-milled together to aid in achieving a homogeneous melt, and then deposited into platinum crucibles. The crucibles were covered with a platinum lid, placed into a furnace operating at about 1450° C., and maintained therein for about four to six hours, the melts being stirred occasionally. The molten batches were poured into steel molds to produce slabs about 6×6×½ inch and these slabs immediately transferred to an annealer operating at about 450°–475° C. The annealed slabs appeared colorless and transparent.

Table I also recites the strain point (Str. Pt.) in ° C., the coefficient of thermal expansion (Coef. Exp.) over the range of 25°–300° C. ($\times 10^{-7}/°C$.), the density (Den.) in g/cc, and the refractive index ($n_D$) where measured on individual specimens.

Table II sets forth chemical analyses performed upon Examples 12 and 16 of Table I to indicate the losses of silver and halide during the melting of the batch.

TABLE II

|  | Batches From Table I | | Batches Normalized to 100% | | Chemical Analyses | |
|---|---|---|---|---|---|---|
|  | 12 | 16 | 12 | 16 | 12 | 16 |
| $SiO_2$ | 64.7 | 64.7 | 61.9 | 62.0 | (61.5)* | (63.4)* |
| $Na_2O$ | 16.4 | 16.2 | 15.7 | 15.7 | 16.2 | 14.3 |
| ZnO | 5.9 | 5.9 | 5.6 | 5.7 | 5.55 | 5.68 |
| $ZrO_2$ | 3.2 | — | 3.1 | — | 2.92 | — |
| $Al_2O_3$ | 9.5 | 12.6 | 9.1 | 12.1 | 9.4 | 12.2 |
| $Sb_2O_3$ | 0.2 | 0.2 | 0.19 | 0.19 | 0.17 | 0.19 |
| SnO | 0.11 | 0.11 | 0.11 | 0.11 | 0.09 | 0.10 |
| $CeO_2$ | 0.05 | 0.05 | 0.05 | 0.048 | 0.044 | 0.044 |
| Ag | 0.01 | 0.01 | 0.01 | 0.01 | 0.006 | 0.006 |
| Br | 1.0 | 1.0 | 0.96 | 0.96 | 0.88 | 0.85 |
| F | 3.4 | 3.4 | 3.25 | 3.26 | 3.26 | 3.25 |

*Not analyzed. Value is difference from 100%.

As can be seen from Table II, the retentions of fluorine and bromine were remarkably high, viz., about 100% and 88%, respectively. By contrast, the loss of silver was about 40%.

Table III reports a visual, qualitative assessment of the polychromatic characteristics exhibited by Examples 1–18 after being treated in accordance with the method disclosed in U.S. Pat. No. 4,092,139. This assessment involved the range of colors produced and the intensity thereof. In each instance, the glass slab was initially exposed for up to four minutes to a 1000-watt mercury-xenon lamp from a distance of fifteen inches, the lamping having a field of focus at a wavelength of about 3200A. The temperature and time (in minutes) to which each sample was exposed during the first heat treatment are reported in the Table as are the time (in minutes) and temperature of the second exposure to the 1000-watt mercury-xenon lamp carried out at a distance of 10 inches from the lamp. Thus, in accordance with U.S. Pat. No. 4,092,139, the second exposure to ultraviolet radiation is undertaken at a temperature between about 200°–410° C.

TABLE III

| Example No. | First Heat Treatment | Second Heat Treatment | Polychromatic Properties |
|---|---|---|---|

TABLE I

|  | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| $SiO_2$ | 62.4 | 63.2 | 64.2 | 64.2 | 63.8 | 62.8 | 62.8 | 63.8 | 64.4 | 64.4 | 64.4 | 64.7 | 63.4 | 64.7 | 64.7 | 64.7 | 66.5 | 72.74 |
| $Na_2O$ | 15.3 | 16.4 | 16.4 | 16.3 | 16.3 | 16.3 | 16.3 | 16.3 | 16.1 | 16.1 | 16.2 | 16.4 | 16.3 | 16.4 | 16.4 | 16.2 | 15.7 | 11.18 |
| ZnO | 11.4 | 9.6 | 7.7 | 8.6 | 9.5 | 9.5 | 9.8 | 9.5 | 5.9 | 5.9 | 5.9 | 5.9 | 4.9 | 6.9 | 8.0 | 5.9 | 6.4 | 7.57 |
| $ZrO_2$ | — | 4.8 | 4.8 | 4.8 | 6.7 | 7.6 | 6.9 | 8.5 | 4.7 | 4.7 | 4.7 | 3.2 | 4.7 | — | — | — | 2.7 | — |
| BaO | 6.4 | 2.9 | 2.9 | 2.9 | 1.0 | 1.0 | 1.3 | 1.0 | 2.0 | — | — | — | — | — | — | — | — | — |
| $Al_2O_3$ | 2.8 | 2.0 | 2.0 | 2.0 | 2.0 | 2.0 | 2.0 | — | 6.6 | 6.6 | 8.5 | 9.5 | 10.3 | 11.6 | 10.5 | 12.6 | 6.4 | 6.26 |
| $B_2O_3$ | 1.0 | — | — | — | — | — | — | — | — | — | — | — | — | — | — | — | — | — |
| $Sb_2O_3$ | 0.50 | 1.0 | 1.0 | 1.0 | 0.6 | 0.6 | 0.6 | 0.6 | 0.2 | 0.2 | 0.2 | 0.2 | 0.2 | 0.2 | 0.2 | 0.2 | 0.2 | 0.18 |
| SnO | 0.10 | 0.10 | 0.10 | 0.10 | 0.15 | 0.15 | 0.15 | 0.15 | 0.05 | 0.05 | 0.09 | 0.11 | 0.11 | 0.11 | 0.11 | 0.11 | 0.05 | 0.04 |
| $CeO_2$ | 0.05 | 0.08 | 0.10 | 0.10 | 0.08 | 0.08 | 0.08 | 0.08 | 0.05 | 0.05 | 0.05 | 0.05 | 0.05 | 0.05 | 0.05 | 0.05 | 0.05 | 0.02 |
| Ag | 0.02 | 0.02 | 0.02 | 0.025 | 0.02 | 0.02 | 0.02 | 0.02 | 0.01 | 0.01 | 0.01 | 0.01 | 0.01 | 0.01 | 0.01 | 0.01 | 0.01 | — |
| Br | 1.1 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 2.8 | 0.9 |
| F | 2.7 | 3.1 | 3.1 | 3.1 | 3.4 | 3.4 | 3.4 | 3.4 | 2.9 | 2.9 | 3.2 | 3.4 | 3.4 | 3.4 | 3.4 | 3.4 | 2.8 | 2.1 |
| $K_2O$ | — | — | — | — | — | — | — | — | — | 2.0 | — | — | — | — | — | — | 2.0 | 1.93 |
| Cl | — | — | — | — | — | — | — | — | — | — | — | — | — | — | — | — | — | 0.4 |
| Str.Pt. | 435 | 434 | — | — | 449 | 451 | 452 | 448 | — | — | 460 | — | 468 | 451 | 448 | 450 | — | — |
| Coef. Exp. | 97 | 100 | — | — | 88 | 93 | 88 | 80 | — | — | 90 | 84 | 84 | 84 | 84 | 84 | — | 71.0 |
| Den. | — | 2.688 | — | — | 2.681 | 2.699 | 2.702 | 2.704 | — | — | 2.570 | 2.555 | 2.564 | 2.527 | 2.539 | 2.518 | — | — |
| $n_D$ | 1.518 | 1.522 | — | — | 1.520 | 1.524 | 1.524 | 1.523 | 1.512 | — | — | — | — | — | — | — | — | — |

| | | | |
|---|---|---|---|
| 1 | 540° C. for 60 min. | 350° C. for 30 min. | Very good |
| 2 | 540° C. for 45 min. | 350° C. for 30 min. | Good |
| 3 | 530° C. for 45 min. | 350° C. for 30 min. | Good |
| 4 | 530° C. for 45 min. | 350° C. for 30 min. | Good |
| 5 | 530° C. for 45 min. | 350° C. for 30 min. | Very good |
| 6 | 460° C. for 30 min. | 350° C. for 30 min. | Good |

TABLE III-continued

| Example No. | First Heat Treatment | Second Heat Treatment | Polychromatic Properties |
|---|---|---|---|
| | + 540° C. for 60 min. | | |
| 7 | 530° C. for 60 min. | 350° C. for 30 min. | Very good |
| 8 | 530° C. for 45 min. | 350° C. for 30 min. | Good |
| 9 | 460° C. for 30 min. | 350° C. for 30 min. | Good |
| | + 540° C. for 60 min. | | |
| 10 | 530° C. for 30 min. | 375° C. for 30 min. | Very good |
| 11 | 530° C. for 30 min. | 375° C. for 30 min. | Very good |
| 12 | 530° C. for 45 min. | 350° C. for 30 min. | Excellent |
| 13 | 530° C. for 45 min. | 350° C. for 30 min. | Excellent |
| 14 | 530° C. for 30 min. | 350° C. for 30 min. | Excellent |
| 15 | 530° C. for 30 min. | 350° C. for 30 min. | Excellent |
| 16 | 530° C. for 30 min. | 350° C. for 30 min. | Excellent |
| 17 | 540° C. for 60 min. | 350° C. for 30 min. | Good |
| 18 | 460° C. for 30 min. | 350° C. for 30 min. | Excellent |
| | + 540° C. for 60 min. | | |

Table IV records the time and temperature parameters of the chemical strengthening processes applied to Examples 1–17 after polychromatic properties had been developed therein through the treatments specified in Table III, along with levels of surface compressive stresses and central tension, as calculated via a Babinet compensator, a measure of the depth of the surface compression layer, as determined by microscpic examination equipped with a filar micrometer, and a modulus of rupture value representing an average of five measurements on standard bar samples.

TABLE IV

| Example No. | Chemical Strengthening | Surface Comp. kg/mm$^2$ | Central Tension kg/mm$^2$ | Layer Depth | Modulus of Rupture |
|---|---|---|---|---|---|
| 1 | 400° C. for 88 hours | 19 | 0.66 | 2.88 | — |
| 2 | 400° C. for 80 hours | 31 | 0.87 | 3.5 | 37,000 psi |
| 3 | 425° C. for 50 hours | 10 | 0.26 | 4.5 | 25,000 psi |
| 4 | 400° C. for 77 hours | 20 | 0.8 | 3.0 | — |
| 5 | 425° C. for 24 hours | 20 | 0.9 | 3.0 | — |
| 6 | 425° C. for 16 hours | 19 | 1.5 | 2.5 | 41,000 psi |
| 7 | 425° C. for 16 hours | 20 | 0.9 | 2.2 | 38,000 psi |
| 8 | 400° C. for 16 hours | 36 | 0.9 | 1.0 | — |
| 9 | 400° C. for 80 hours | 28 | 1.25 | 2.8 | — |
| 9 | 425° C. for 48 hours | 18 | 0.7 | 4.4 | — |
| 10 | 400° C. for 80 hours | 26 | 1.57 | 3.5 | — |
| 10 | 425° C. for 50 hours | 14 | 1.17 | 4.4 | |
| 11 | 443° C. for 24 hours | 17 | 1.0 | 3.9 | 33,000 psi |
| 12 | 443° C. for 24 hours | 12 | 0.7 | 3.7 | — |
| 13 | 443° C. for 16 hours | 22.5 | 1.2 | 2.5 | 37,000 psi |
| 14 | 425° C. for 16 hours | 23 | 0.9 | 2.7 | 29,000 psi |
| 15 | 425° C. for 16 hours | 23 | 0.9 | 2.7 | 30,000 psi |
| 16 | 425° C. for 16 hours | 25 | 0.8 | 2.8 | 32,000 psi |
| 17 | 400° C. for 80 hours | 24 | 1.25 | 3.3 | — |

I claim:

1. Polychromatic glasses which, after chemical strengthening, exhibit a surface compression layer having a depth of at least 0.002", a maximum central tension of at least 0.7 kg/mm$^2$, and a modulus of rupture of at least approximately 30,000 psi consisting essentially, by weight on the oxide basis as calculated from the batch, of about 11–18% Na$_2$O, 60–70% SiO$_2$, 2–12% ZrO$_2$, 0.005–0.3% Ag, 1–4% F, and an amount of at least one halide selected from the group of Cl, Br, and I sufficient to react stoichiometrically with the Ag, but not more than about 3%.

2. Polychromatic glasses according to claim 1 also containing 0.01–0.2% CeO$_2$.

3. Polychromatic glasses according to claim 1 also containing up to 14% Al$_2$O$_3$ and/or up to 18% ZnO, the total Al$_2$O$_3$ + ZnO not exceeding about 20%.

4. Polychromatic glasses according to claim 2 consisting essentially of 14–17% Na$_2$O, 62–68% SiO$_2$, 3–8% ZrO$_2$, 2–12% Al$_2$O$_3$; 5–13% ZnO, 0.005–0.3% Ag, 1–4% F, and an amount of at least one halide selected from the group of Cl, Br, and I sufficient to react stoichiometrically with the Ag, but not more than about 3%.

5. Polychromatic glasses according to claim 1 manifesting a refractive index of at least 1.523 consisting essentially, by weight on the oxide basis as calculated from the batch, of about 11–18% Na$_2$O, 60–70% SiO$_2$, 3–12% ZrO$_2$, 0–18% ZnO and/or 0–14% Al$_2$O$_3$, the total ZnO + Al$_2$O$_3$ not exceeding about 20%, 0–5% BaO, 0.005–0.3% Ag, 1–4% F, and an amount of at least one halide selected from the group of Cl, Br, and I sufficient to react stoichiometrically with the Ag, but not more than about 3%.

* * * * *

UNITED STATES PATENT AND TRADEMARK OFFICE
CERTIFICATE OF CORRECTION

PATENT NO. : 4,212,919
DATED : July 15, 1980
INVENTOR(S) : Syed N. Hoda

It is certified that error appears in the above-identified patent and that said Letters Patent are hereby corrected as shown below:

Column 1, line 44, change "NaF'" to -- NaF + --.

Column 1, line 53, change "called" to -- cooled --.

Column 3, line 8, change "class" to -- glass --.

Column 3, line 22, change "text" to -- test --.

Column 3, line 37, change "embodiment" to -- glasses --.

Column 5, line 58, change "475'C." to -- 475°C. --.

Column 6, line 10, change "1-14 4%" to -- 1-4% --.

Column 8, line 29, change "lamping" to -- lamp --.

Column 9, line 26, change "microscpic" to -- microscopic --.

Signed and Sealed this

Sixth Day of January 1981

[SEAL]

Attest:

SIDNEY A. DIAMOND

Attesting Officer

Commissioner of Patents and Trademarks